United States Patent
Cerea

(10) Patent No.: US 6,551,026 B2
(45) Date of Patent: Apr. 22, 2003

(54) METHOD OF REMEDIATING HEAVY METAL-CONTAINING SOIL

(75) Inventor: Giuseppina Cerea, Rozzano (IT)

(73) Assignee: Vomm Chemipharma S.r.l., Milan (IT)

( * ) Notice: Subject to any disclaimer, the term of this patent is extended or adjusted under 35 U.S.C. 154(b) by 0 days.

(21) Appl. No.: 09/897,602

(22) Filed: Jul. 3, 2001

(65) Prior Publication Data
US 2002/0025227 A1 Feb. 28, 2002

(30) Foreign Application Priority Data

Jul. 4, 2000 (IT) .................................. MI2000A1502

(51) Int. Cl.[7] .................................................. B09C 1/08
(52) U.S. Cl. ................................ 405/128.8; 588/236
(58) Field of Search ........................ 405/128.5–128.6, 405/128.7–128.85; 588/236, 237

(56) References Cited

U.S. PATENT DOCUMENTS

| | | | | |
|---|---|---|---|---|
| 5,193,936 A | * | 3/1993 | Pal et al. ............... | 405/128.75 |
| 5,234,485 A | * | 8/1993 | Bösling ................... | 405/263 |
| 5,710,361 A | * | 1/1998 | Harrington et al. ...... | 405/128.5 |
| 5,766,930 A | * | 6/1998 | Kohr ........................ | 423/22 |
| 5,779,986 A | * | 7/1998 | van Endert et al. ..... | 422/136 |
| 5,895,832 A | * | 4/1999 | Eccles ..................... | 405/128.5 |
| 5,919,001 A | * | 7/1999 | Lin .......................... | 405/128.75 |
| 5,968,359 A | * | 10/1999 | Krahn et al. ............. | 405/128.75 |
| 6,159,726 A | * | 12/2000 | Kohr ........................ | 423/22 |
| 6,410,304 B2 | * | 6/2002 | Kohr ........................ | 423/24 |

FOREIGN PATENT DOCUMENTS

| | | |
|---|---|---|
| DE | 43 19 974 A1 | 12/1994 |
| DE | 195 47 271 A1 | 6/1997 |
| EP | 0 728 728 A1 | 8/1996 |
| WO | WO 95/25594 A1 | 9/1995 |

* cited by examiner

Primary Examiner—Robert E. Pezzuto
Assistant Examiner—Tara L. Mayo
(74) Attorney, Agent, or Firm—Sughrue Mion, PLLC

(57) ABSTRACT

A method of remediating soil that contains heavy metals comprises the steps of removing and sieving heavy metal-containing soil to separate stones and gravel, and treating the sieved soil, in a thin layer kept in a strongly turbulent state, with a solution of an alkali sulfide at a temperature of at least 50° C.

14 Claims, 1 Drawing Sheet

US 6,551,026 B2

METHOD OF REMEDIATING HEAVY METAL-CONTAINING SOIL

FIELD OF APPLICATION

The present invention relates generally to the remediation of contaminated soil.

In particular, the invention relates to a method of remediating soil that has been contaminated with heavy metals.

BACKGROUND ART

Contamination of the soil with heavy metals has long been a major environmental concern. Contamination from heavy metals, especially cadmium, lead and mercury, may be caused by such industrial activities as metal-processing, tanning, chemical processes employing metal catalysts, etc.

There have been several proposals directed to solve the problem, but none that has proved entirely satisfactory.

One prior method consisted of treating the soil in situ with solutions of alkali sulfides, and percolating the solutions through the soil to cause the heavy metal cations to react with the sulfide anions and yield very low-soluble sulfides. (For example, the solubility products of cadmium, lead and mercury are $1.4 \times 10^{-28}$, $1.0 \times 10^{-29}$, and $3.0 \times 10^{-53}$, respectively.)

The cations of the heavy metals are blocked, by virtue of the above compounds being insoluble, and are no longer in a condition to contaminate springs and crops.

With such a method, however, a conversion rate into insoluble sulfides of no more than 70% is obtained, even where the soil comprises a substantial proportion of sand, making for better contact of the alkali sulfide solution with the heavy metal compounds.

In an attempt at improving the above method, it has been proposed (DE 19547271) of treating the soil with an acid solution, specifically a hydrochloric acid solution, subsequently to the step of percolating the soil with the sulfide solution. In this way, a conversion rate of heavy metals to sulfides upward of 99% is reportedly obtained.

However, the last-mentioned method has a major limitation in that it is only successful where the soil mostly comprises sand, since in this case good contact can be ensured between the reactant (alkali sulfide) and the heavy metal cations. On the other hand, a soil that is rich in clay or other cohesive components would hinder that contact, and the conversion to insoluble sulfides becomes incomplete.

SUMMARY OF THE INVENTION

The problem underlying this invention is to provide a method of remediating soil that contains heavy metals, whereby the aforementioned deficiencies of prior methods can be overcome.

The problem is solved, according to the invention, by a method comprising the steps of:

removing and sieving a heavy metal-containing soil to remove stones and gravel; and treating said sieved soil, arranged in a thin layer and maintained in a highly turbulent condition, with a solution of an alkali sulfide at a temperature of at least 50° C.

Preferably, the step of treating the sieved soil with an alkali sulfide solution is preceded by a step of adjusting the soil pH to a value equal to or lower than 6.

The method is implemented more advantageously in an apparatus known as a "turbo-reactor".

In this case, the inventive method comprises the steps of:

removing and sieving a heavy metal-containing soil to remove stones and gravel;

feeding a continuous stream of said soil into a turbo-reactor, which reactor comprises a cylindrical tubular body being laid with its axis horizontal, closed by end walls at its opposite ends, and provided with inlet openings for the soil to be treated and for at least one reactant, as well as provided with at least one discharge opening, a bladed rotor rotatably mounted in the cylindrical tubular body and driven at a high rotational speed to produce a stream of finely divided soil particles, and a heating jacket for raising the temperature of the inner wall of the cylindrical tubular body to at least 110° C.;

feeding a continuous stream of a reactant in the form of an aqueous solution of an alkali sulfide into the turbo-reactor in cocurrent with the soil stream; centrifuging the soil particles and the alkali sulfide solution against the inner wall of the cylindrical tubular body to form a highly turbulent, tubular dynamic fluid layer wherein the soil particles and the alkali sulfide solution are urged mechanically in intimate mutual contact by the rotor blades; and reacting the soil and the alkali sulfide in the thin layer while the latter is being urged, substantially in contact with the heated inner wall, toward said at least one discharge opening of the turbo-reactor, with simultaneous generation of steam.

Said step of feeding in a continuous stream of an aqueous solution of alkali sulfide is preferably preceded by a step of adjusting the soil pH to a value equal to or lower than 6.

This pH adjusting step is carried out conveniently by feeding into the turbo-reactor a continuous stream of an aqueous acid solution in cocurrent with the soil stream.

An aqueous solution of a strong acid selected from hydrochloric acid or sulfuric acid is preferred, at a concentration in the 0.01N to 1N range, advantageously equal to 0.1N.

An opening for exhausting any vapors released during the treatment may be provided conveniently, and the exhaust opening may be connected to a scrubber for removing any hydrogen sulfide formed when the soil is markedly acidic.

To enhance the heavy metal insolubilization process, a continuous stream of an alkali silicate, having complexating and agglomerating properties, may be fed into the turbo-reactor through an inlet opening provided downstream of the inlet opening for the alkali sulfide solution.

The alkali sulfide solution is preferably a sodium sulfide solution, with a concentration of 5 to 15%, preferably about 12%, w/v.

The temperature of the turbo-reactor inner wall is preferably 110° to 220° C.

The treated soil exits the turbo-reactor at a temperature of about 50° to 90° C.

The peripheral velocity of the bladed rotor is preferably 20 to 40 meters per second.

The average time of residence of the soil being processed in the turbo-reactor varies generally between 30 and 120 seconds.

The amount of alkali sulfide solution used in the method of this invention generally exceeds the stoichiometric amount demanded by the proportion of heavy metals in the soil, as evaluated by a preliminary analysis of the soil composition. This because other metals, such as iron, present in the soil would also react with the sulfide.

The application of the inventive method results in a practically quantitative formation of insoluble sulfides from the cations of heavy metals in the soil, irrespective of the soil characteristics and its content in clay or cohesive components.

This is achieved by the creation of the aforementioned turbulent thin dynamic layer, in which the soil is divided into very fine particles so that heavy metal cations become liable to an intimate contact with the reactant. The reaction by which the cations are converted into alkali sulfides is promoted and accelerated by the elevated temperature of the turbo-reactor inner wall, the thin dynamic layer comprised of soil particles and tiny droplets of the reactant solution being forced to flow along said inner wall.

The method of this invention will be described in greater detail with reference to the accompanying drawing and through some exemplary and non-limiting embodiments thereof.

DETAILED DESCRIPTION

Figure 1:
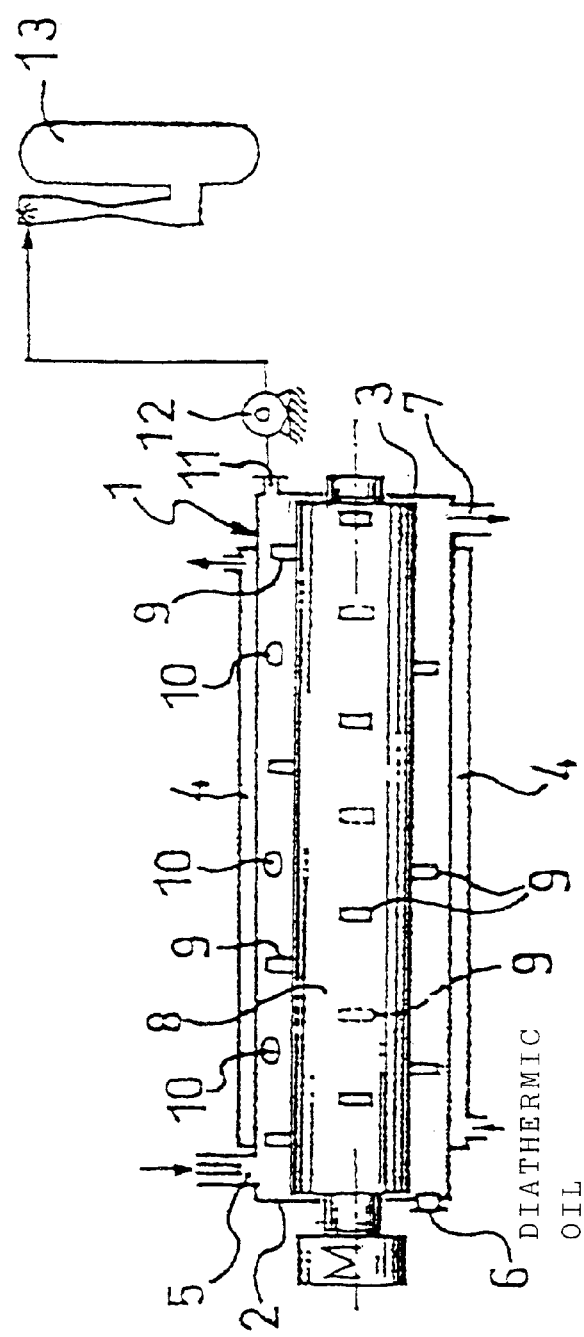
FIG. 1 is a longitudinal section view showing schematically an apparatus on which the inventive method can be implemented.

With reference to FIG. 1, an apparatus used for implementing the method according to the invention includes a turbo-reactor, essentially comprising a cylindrical tubular body 1 closed at its opposite ends by end walls 2,3 and provided coaxially with a heating jacket 4 through which a fluid, e.g. a diathermic oil, is caused to flow such that the temperature of the inner wall of the cylindrical tubular body 1 can be maintained at no less than 110° C.

The cylindrical tubular body is formed with inlet openings 5,6 for the sieved soil containing heavy metals and the alkali sulfide solution, respectively, and with a processed-soil discharge opening 7.

Mounted rotatably inside the cylindrical tubular body 1 is a bladed rotor 8, whose blades 9 are laid into a helical pattern and oriented to centrifuge and simultaneously urge the soil and reactant toward the turbo-reactor outlet.

The bladed rotor 8 is driven by a motor M at a peripheral velocity varying from 20 to 40 meters per second.

Reactant inlet openings 10 are formed through the inner wall of the tubular body 1.

In particular, when an alkali silicate solution is used in the inventive method along with the alkali sulfide solution, the latter is fed through the inlet opening 6 of the turbo-reactor and the alkali silicate solution is fed through the openings 10 in the inner wall.

On the other hand, when only the alkali sulfide solution is used in the inventive method, the solution may be fed through either the inlet opening 6 of the turbo-reactor, or the openings 10 in the inner wall, or both.

Finally, should the pH of the sieved soil require preliminary adjustment, the aqueous acid solution is fed through the inlet opening 6 of the turbo-reactor, and the alkali sulfide solution fed through the inner wall openings 10. Where an alkali silicate solution is to be used additionally to the acid and alkali sulfide solutions, the alkali silicate solution is fed through one or more of the inner wall openings 10 located in the downstream area of the turbo-reactor, while the alkali sulfide solution is fed through one or more of the inner wall openings located in the upstream area of the turbo-reactor. In this case, the acid solution is fed through the inlet opening 6 of the turbo-reactor.

The turbo-reactor also has an opening 11 for exhausting internally released vapors, the exhaust opening 11 being connected, over a suction fan 12, to a scrubber 13, only shown schematically, for removing any hydrogen sulfide contained in the vapor by scrubbing with alkali solutions.

EXAMPLE 1

A continuous stream of soil containing heavy metals (in particular, chromium, mercury and lead), which soil had been previously relieved of stones and gravel by a sieving step, is fed, at a flow rate of 100 kg/h, into a turbo-reactor having a cylindrical tubular body 1 with an inside diameter of 300 mm, and having a bladed rotor 8 driven at 1000 RPM, the temperature of its inner wall being maintained at 200° C.

Simultaneously therewith, a stream of a solution of $Na_2S$ 12% w/v is fed through the inlet opening 6 and the inner wall openings 10 at a flow rate of 5 liters/hour.

From the very moment that the soil stream enters the turbo-reactor, it is shattered mechanically into minute particles that are at once centrifuged against the inner wall of the turbo-reactor, where they will form a thin tubular dynamic layer.

At the same time, the aqueous sodium sulfide solution introduced through the opening 6 is atomized by the blades 9 of the rotor 8, which will also centrifuge the resulting droplets. Thus, the droplets are incorporated into the thin tubular dynamic layer of soil particles, which results in an intimate contact between the cations of the heavy metals contained in the soil particles and the reactant.

The sodium sulfide solution added in atomized form through the openings 10 further enhances the interaction of the reactant with the soil particles, thereby bringing to completion the insoluble sulfide-forming reaction, which proceeds from the cations of heavy metals in the soil particles.

After a residence time of about 60 seconds in the turbo-reactor, the soil reacted with the sodium sulfide solution is discharged through the opening 7 continuously. The soil temperature at the turbo-reactor outlet is approximately 90° C.

Vapors released inside the turbo-reactor are exhausted by the suction fan 12 through the opening 11 and conveyed to the scrubber 13, where they are scrubbed with soda to separate any trace hydrogen sulfide.

An analysis of the soil discharged out of the turbo-reactor, directed to determine its content of soluble chromium, mercury and lead compounds, reveals that such compounds are virtually absent, or at least below the threshold of detectability (IRSA Method—acetic acid).

EXAMPLE 2

A continuous stream of soil containing heavy metals (in particular chromium, mercury and lead), which soil has a pH of about 5 to 6 and had been previously freed of stones and gravel by a sieving step, is fed, at a flow rate of 100 kg/h, into a turbo-reactor having a cylindrical tubular body 1 with an inside diameter of 300 mm, and having a bladed rotor 8 driven at 1000 RPM, the temperature of its inner wall being maintained at 220° C.

Simultaneously therewith, an atomized stream of a solution of $Na_2S$ 12% w/v is fed through the inlet opening 6 at a flow rate of 5 l/h, and a stream of a sodium silicate solution 10& w/v is fed through the inner wall openings 10 at a flow rate of 10 l/h.

As it enters the turbo-reactor, the soil stream is shattered mechanically into minute particles, which are at once centrifuged against the inner wall of the turbo-reactor, where they will form a thin tubular dynamic layer.

At the same time, the aqueous sodium sulfide solution introduced through the opening 6 is atomized by the blades 9 of the rotor 8, which will also centrifuge the resulting droplets. The droplets are thus incorporated into the thin tubular dynamic layer of soil particles, which results in an intimate contact between the cations of the heavy metals contained in the soil particles and the reactant.

The sodium silicate solution added in atomized form through the openings 10 is also blended in droplets with the thin tubular dynamic layer that includes the soil particles and the atomized sodium sulfide solution.

After a residence time of about 60 seconds in the turbo-reactor, the soil reacted with the sodium sulfide and sodium silicate solutions is discharged through the opening 7 continuously. The soil temperature at the turbo-reactor outlet is approximately 95° C.

Vapors released inside the turbo-reactor are exhausted by the suction fan 12 through the opening 11 and conveyed to the scrubber 13, where they are scrubbed with soda to remove any trace hydrogen sulfide.

An analysis of the soil discharged out of the turbo-reactor, directed to determine its content of soluble chromium, mercury and lead compounds, reveals that such compounds are virtually absent, or at least below the threshold of detectability (IRSA Method—acetic acid).

EXAMPLE 3

A continuous stream of soil containing heavy metals (in particular, chromium, mercury and lead), which soil has pH of about 5 to 6 and had been previously freed of stones and gravel by a sieving step, is fed, at a flow rate of 100 kg/h, into a turbo-reactor having a cylindrical tubular body 1 with an inside diameter of 300 mm and having a bladed rotor 8 driven at 1000 RPM, the temperature of its inner wall being maintained at 180° C.

Simultaneously therewith, an atomized stream of a 0.1 N HCl solution is fed through the inlet opening 6 at a flow rate of 5 l/h, and a stream of a solution of sodium sulfide 12&, w/v is fed through the inner wall openings 10 at a flow rate of 5 l/h.

After a residence time of about 60 seconds in the turbo-reactor, the soil reacted with the sodium sulfide solution is discharged through the opening 7 continuously. The soil temperature at the turbo-reactor outlet is approximately 85° C. and its pH about 5.5.

Vapors released inside the turbo-reactor are exhausted by the suction fan 12 through the opening 11 and conveyed to the scrubber 13, where they are scrubbed with soda to remove any trace hydrogen sulfide.

An analysis of the soil discharged out of the turbo-reactor, directed to determine its content of soluble chromium, mercury and lead compounds, reveals that such compounds are virtually absent, or at least below the threshold of detectability (IRSA Method—acetic acid).

With the method of this invention, any soil that has been contaminated with heavy metals can be remediated more efficiently and reliably than with conventional methods.

Furthermore, the apparatus for implementing this method is relatively inexpensive to install and run; it is also quite compact, and can be transferred by road or another carrier to a site where the remediation can take place on the spot, thus avoiding the cost of transferring the soil to be processed.

In addition, the method provides a continuous form of processing, from which running costs are sure to benefit, is time-efficient, and can sustain a high hourly throughput.

Changes and modifications may be made unto the invention described hereinabove within the protection scope of the following claims.

What is claimed is:

1. A method of remediating soil that contains heavy metals, comprising the steps of:
   removing and sieving a heavy metal-containing soil to remove stones and gravel;
   feeding a continuous stream of said soil into a turbo-reactor, which reactor comprises a cylindrical tubular body being laid with its axis horizontal, closed by end walls at its opposite ends, and provided with inlet openings for the soil to be treated and inlet openings for at least one reactant, as well as provided with at least one discharge opening, a bladed rotor rotatably mounted in the cylindrical tubular body and driven at a high rotational speed to produce a stream of finely divided soil particles, and a heating jacket for raising the temperature of the inner wall of the cylindrical tubular body to at least 110° C.;
   feeding a continuous stream of a reactant in the form of an aqueous solution of an alkali sulfide into the turbo-reactor in cocurrent with the soil stream; centrifuging the soil and the alkali sulfide solution against the inner wall of the cylindrical tubular body to form a highly turbulent, tubular dynamic fluid layer wherein the soil particles and the alkali sulfide solution are urged mechanically in intimate mutual contact by the rotor blades; and
   reacting the soil and the alkali sulfide in the thin layer while the latter is being urged, substantially in contact with the heated inner wall, toward said at least one discharge opening of the turbo-reactor, with simultaneous generation of steam,
   continuously discharging said soil stream through said at least one discharge opening (7).

2. A method according to claim 1, further comprising the step of adjusting the pH of said sieved soil to a value equal to or lower than 6, before said step of feeding in a continuous stream of said reactant.

3. A method according to claim 2, wherein said inlet openings for feeding in at least one reactant comprise one opening formed in the end wall of said cylindrical tubular body adjacent to at least one of said soil inlet openings, and at least another opening formed in the inner wall of said cylindrical tubular body, said method comprising the steps of:
   feeding in an aqueous acid solution through said opening provided in said end wall; and
   feeding in said alkali sulfide solution through said at least one opening formed in said inner wall.

4. A method according to claim 3, wherein said acid is a strong acid selected from a group consisting of hydrochloric acid and sulfuric acid.

5. A method according to claim 2, comprising a step of exhausting said steam through said at least one discharge opening of said turbo-reactor, and conveying said steam to a scrubber where said steam is scrubbed using alkali solutions.

6. A method according to claim 1, wherein said inlet openings for feeding in at least one reactant comprise one opening formed in the end wall of said cylindrical tubular body adjacent to at least one of said soil inlet openings, and at least another opening formed in the inner wall of said cylindrical tubular body, said method comprising the steps of:

feeding in said alkali sulfide solution through said opening formed in said end wall; and feeding an alkali silicate solution through said at least one opening formed in said inner wall.

7. A method according to claim 6, wherein said alkali silicate solution is an aqueous solution of sodium silicate with a concentration of 5% to 40% w/v.

8. A method according to claim 2, wherein said alkali sulfide solution is a sodium sulfide solution with a concentration of 5% to 15% w/v.

9. A method according to claim 6, comprising a step of exhausting said steam through said at least one discharge opening of said turbo-reactor, and conveying said steam to a scrubber where said steam is scrubbed using alkali solutions.

10. A method according to claim 1, comprising a step of exhausting said steam through a discharge opening of said turbo-reactor, and conveying said steam to a scrubber where said steam is scrubbed using alkali solutions.

11. A method according to claim 1, wherein said alkali sulfide solution is a sodium sulfide solution with a concentration of 5% to 15% w/v.

12. A method according to claim 1, wherein the temperature of the inner wall of said cylindrical tubular body is 110° to 220° C.

13. A method according to claim 1, wherein said bladed rotor is rotated at a peripheral velocity of 15 to 40 m/s.

14. A method according to claim 13, wherein the average residence time of said soil in the turbo-reactor varies between 30 and 120 seconds.

* * * * *